United States Patent
Luo et al.

(10) Patent No.: US 6,906,443 B2
(45) Date of Patent: Jun. 14, 2005

(54) BRUSHLESS DC MOTOR WITH STEPPED SKEWED ROTOR

(75) Inventors: Jian Luo, Pasadena, CA (US); Jose Antonio Hernandez, deceased, late of West Covina, CA (US); Maria Hernandez, legal representative, West Covina, CA (US); John Laskowsky, Redondo Beach, CA (US)

(73) Assignee: Eaton Corporation, Cleveland, OH (US)

( * ) Notice: Subject to any disclaimer, the term of this patent is extended or adjusted under 35 U.S.C. 154(b) by 112 days.

(21) Appl. No.: 10/419,620

(22) Filed: Apr. 21, 2003

(65) Prior Publication Data

US 2004/0207280 A1 Oct. 21, 2004

(51) Int. Cl.$^7$ .............................................. H02K 21/12
(52) U.S. Cl. ................................................ 310/156.47
(58) Field of Search ........................ 310/156.01–156.84

(56) References Cited

U.S. PATENT DOCUMENTS

| | | | |
|---|---|---|---|
| 4,845,837 A | 7/1989 | Lloyd ........................... 29/598 |
| 5,010,266 A | * 4/1991 | Uchida .................. 310/156.22 |
| 5,034,642 A | 7/1991 | Hoemann et al. ........... 310/156 |
| 5,758,709 A | 6/1998 | Boyd, Jr. ..................... 164/109 |
| 5,990,595 A | 11/1999 | Crowell ....................... 310/261 |
| 6,005,318 A | 12/1999 | Pop, Sr. ....................... 310/156 |
| 6,195,875 B1 | 3/2001 | Neuenschwander .......... 29/732 |
| 6,252,323 B1 | * 6/2001 | Nishikawa et al. ..... 310/156.01 |
| 6,369,686 B1 | * 4/2002 | Pielok ......................... 336/234 |
| 6,384,503 B1 | 5/2002 | Iwaki et al. ........... 310/156.47 |
| 6,396,182 B1 | 5/2002 | Pop, Sr. .................. 310/156.22 |
| 6,462,452 B2 | 10/2002 | Nakano et al. ........ 310/156.47 |
| 6,512,318 B2 | 1/2003 | Torok et al. ................. 310/181 |
| 6,520,742 B1 | 2/2003 | Forrester et al. ........ 416/220 R |
| 6,657,349 B2 | * 12/2003 | Fukushima ............ 310/156.47 |
| 6,777,847 B1 | * 8/2004 | Saban et al. ................. 310/211 |

FOREIGN PATENT DOCUMENTS

JP 08-251847 * 9/1966 ............ H02K/1/27

OTHER PUBLICATIONS

Magnetic Field Analysis of a Permanet Magnet Motor With a Skewed Rotor Using the Finite Element Method and a 3–D Mesh Coupling Method by Yasuto Taniguchi, Akihiko Miwa, Hiroshi Hashimoto, Koji Tani and Takashi Yamada (The Japan Research Institute, Ltd.).
A.O. Smith Electrical Products Company, the AC's & DC's of Electric Motors Title Pages and p. 37.

* cited by examiner

*Primary Examiner*—Darren Schuberg
*Assistant Examiner*—Nguyen Hanh
(74) *Attorney, Agent, or Firm*—Maroin K. Ünion

(57) ABSTRACT

A brushless DC permanent magnet motor having a step skewed rotor including a rotor shaft having a portion having a substantially uniform cross sectional configuration defined by N planar sides of substantially equal length and width wherein N is equal to the number of poles of the motor, first and second annular sets of N number of substantially identically shaped bread loaf magnets one of which is attached to each of the N planar sides of the rotor shaft wherein the magnets of the first set have their orientation reversed with respect to the magnets of the second set and the magnets of the first set are offset or skewed by a predetermined skew angle from the magnets of the second set of magnets to form a stepped skewed rotor.

17 Claims, 4 Drawing Sheets

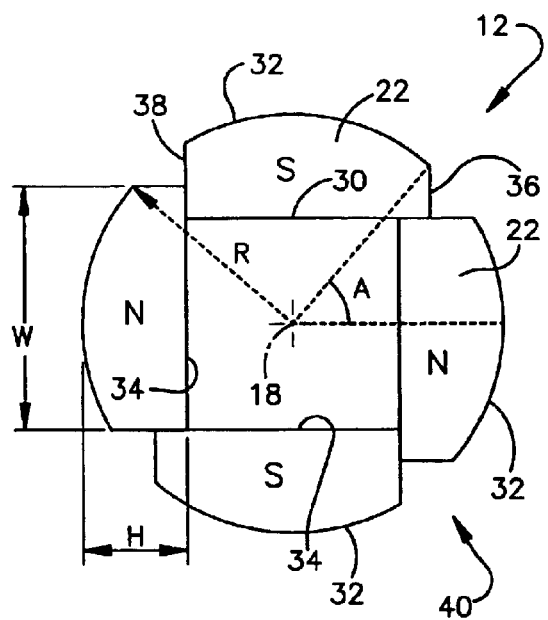
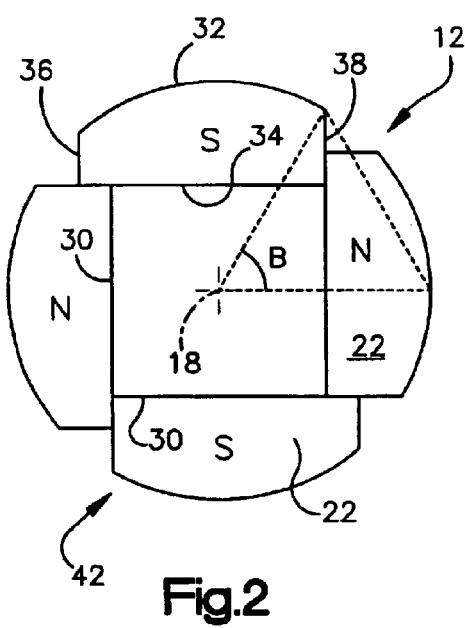
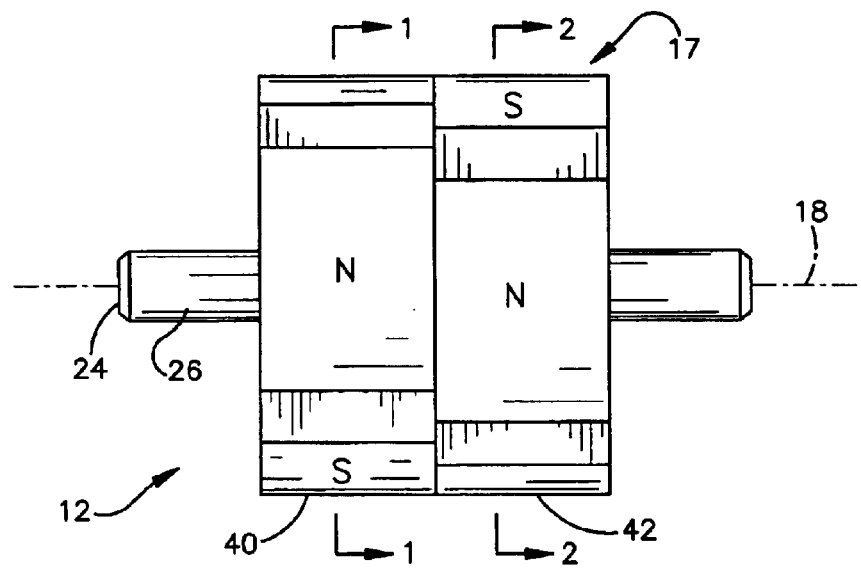
Fig.1　Fig.2
Fig.3

BRUSHLESS DC MOTOR WITH STEPPED SKEWED ROTOR

BACKGROUND OF THE INVENTION

The present invention relates to a brushless DC motor having a step skewed rotor and more particularly to a skewed rotor formed from a plurality of identically shaped bread loaf magnets mounted on a rotor shaft having a portion having a substantially uniform cross sectional configuration.

Permanent magnet motors with skewed rotors are known in the prior art. One known arrangement utilizes a skewed rotor wherein complicated machining is required to produce the individual skewed rotor sections which are mounted on a cylindrical shaft to form the skewed rotor. The non-linearity of the surfaces of each skewed magnet are difficult and costly to machine.

It is also known to utilize shaped magnets to create a step skew on the rotor wherein the rotor shaft is machined differently for different rotor sections to cause the step skew. This results in costly extra machining effort and problems in maintaining the required tight tolerances.

Step skew is also known utilizing a square rotor shaft having a substantially uniform cross sectional area where magnets of different shapes are utilized to affect the step skew. The utilization of different shaped magnets also requires costly extra machining and assembly effort.

From a commercial and manufacturing stand point, it is desirable to minimize the cost and complexity of the skewed rotor construction by utilizing a rotor shaft having a substantially uniform cross sectional area and by utilizing a plurality of bread loaf shaped magnets having a substantially uniform size and shape to construct the stepped skewed rotor.

BRIEF SUMMARY OF THE INVENTION

The present invention provides a new and improved brushless DC motor having a step skewed rotor including a housing, a stator, a step skewed rotor rotatable about an axis of rotation within the stator and wherein the step skewed rotor includes a rotor shaft having a portion of which has a uniform cross sectional configuration taken in a direction substantially perpendicular to the axis of rotation, defined by N planar sides of substantially equal length and width wherein N is equal to the number of poles of the motor, and first and second sets of N number of substantially identically shaped magnets one of each set being attached to each of the N planar sides of the rotor shaft with each of the magnets having a bread loaf shape. Each of the N planar sides of the rotor shaft having one magnet of the first set and one magnet of the second set attached thereto with the one magnet of the first set being disposed substantially contiguous to the one magnet of the second set on each of the N planar sides of the rotor shaft and wherein each of the second set of N number of magnets is offset from each of the first set of N number of magnets to form a step skewed rotor.

Another provision of the present invention is to provide a new and improved brushless DC motor having a step skewed rotor including a housing, a stator located within the housing, a step skewed rotor located within the housing and rotatable about an axis of rotation within the stator, including a rotor shaft having a portion of which has a uniform cross sectional configuration taken in a direction substantially perpendicular to the axis of rotation defined by N planar sides of substantially equal length wherein N is equal to the number of poles of the motor. First and second sets of N number of substantially identical shaped bread loaf magnets are provided each of which includes a planar bottom surface for attachment to one of the N planar sides of the rotor shaft and a top arcuate surface which in part defines a cylindrical surface having a center which is located on the axis of rotation and first and second side surfaces which extends from said planar bottom surface to said arcuate surface. Each of the N planar sides of the rotor shaft have one bread loaf magnet of the first set and one bread loaf magnet of the second set attached thereto and being disposed contiguous to each other and wherein each of the second set of N number of bread loaf magnets is offset from each of the first set of N number of bread loaf magnets by a predetermined amount to form a step skewed rotor.

The various features of novelty which characterize the invention are pointed out with particularity in the claims annexed to and forming a part of this disclosure. For a better understanding of the invention, its operating advantages, and specific objects obtained by its use, reference is made to the accompanying examples, drawings, and descriptive matter in which a preferred embodiment of the invention is illustrated.

BRIEF DESCRIPTION OF THE DRAWINGS

FIG. 1 is a cross sectional view illustrating the step skewed rotor taken approximately along the lines 1—1 of FIG. 3.

FIG. 2 is a cross sectional view of the step skewed rotor taken approximately along the lines 2—2 of FIG. 3.

FIG. 3 is a side cross sectional view of a step skewed rotor constructed in accordance with the present invention.

DETAILED DESCRIPTION OF THE INVENTION

Figure 4:
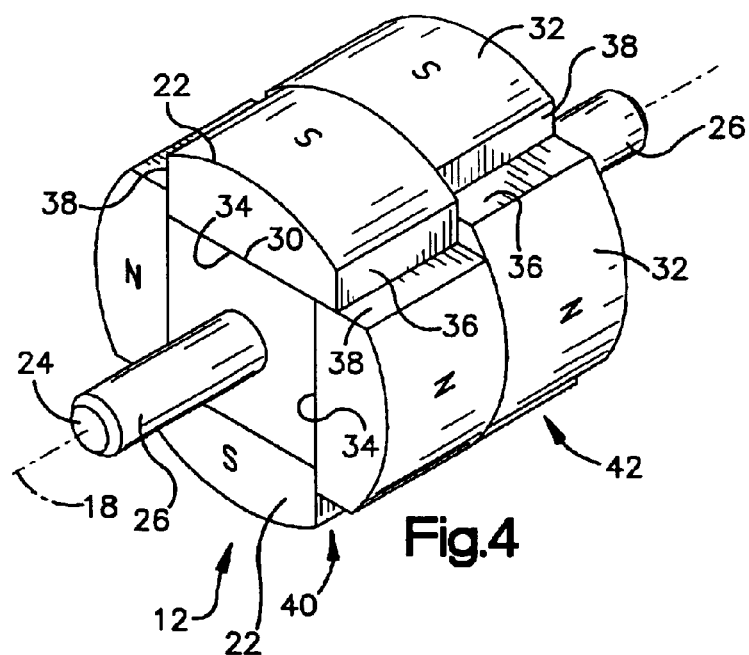
FIG. 4 is a perspective view of the step skewed rotor of the present invention.
Figure 5:
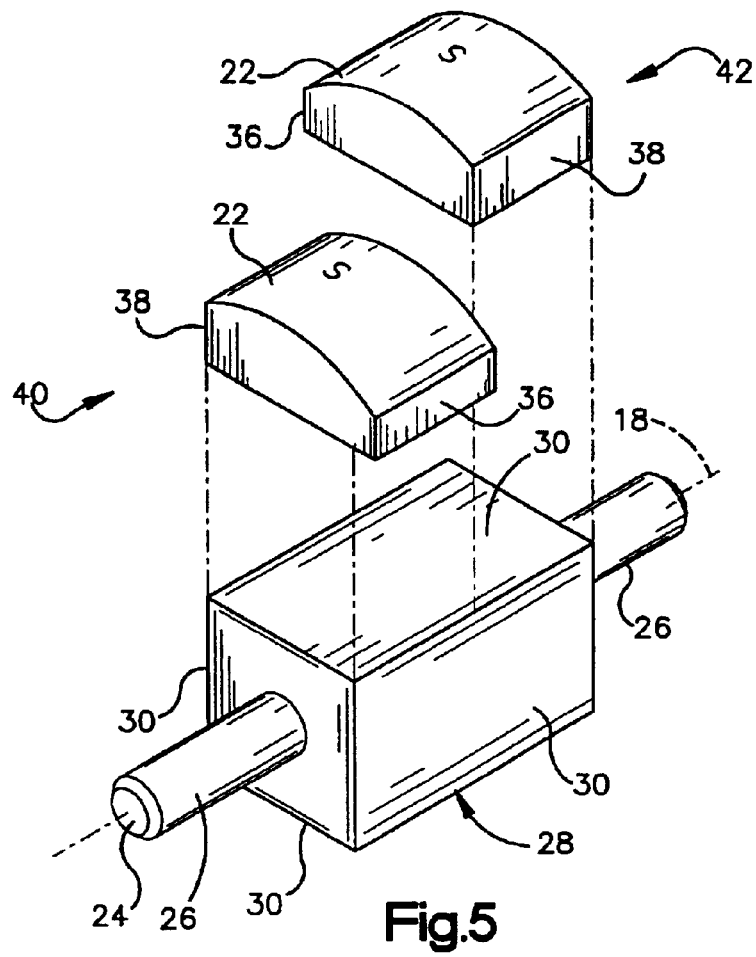
FIG. 5 is a perspective view of the rotor shaft with the magnets removed.
Figure 6:
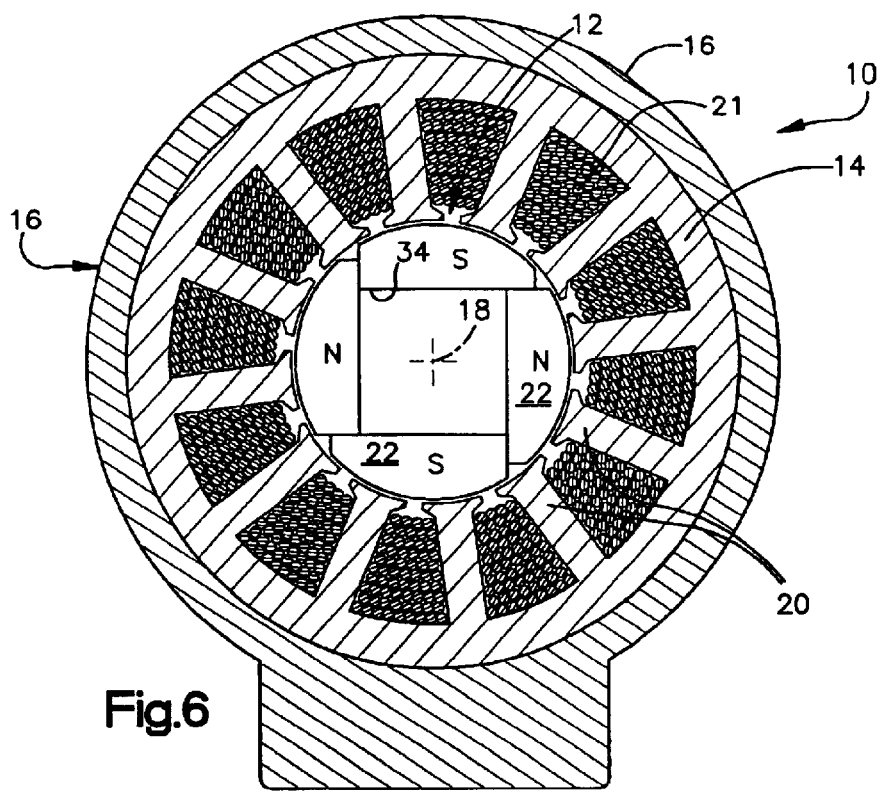
FIG. 6 is a cross section of a brushless step skewed rotor located in a DC motor constructed with bread loaf magnets in accordance with the present invention.

Referring to the Figures and more particularly to FIGS. 1–6. A brushless DC four-pole motor 10 having a step skewed permanent magnet rotor 12 is illustrated. The rotor 12 may be preferably supported for rotation within an armature 14 supported within a housing 16 in a well known manner. The rotor 12 is supported for rotation about its longitudinal axis 18.

The armature includes a plurality of stator teeth 20 each of which support a stator coil 21 thereon. The rotor 12 includes a plurality of permanent magnets 22 which are supported on a rotor shaft 24 for rotation therewith. Sequential energization of the stator coils 21 effects rotation of the rotor 12 in a well known manner.

The rotor 12 includes rotor shaft 24 which has a pair of cylindrical end portions 26 which have a generally cylindrical cross sectional configuration taken in a direction of substantially perpendicular to the axis of rotation 18 and a rectangular portion 28 which has a square cross sectional configuration taken in a direction substantially perpendicular to the axis of rotation 18. The cylindrical portions 26 are adapted to support the rotor 12 for rotation in bearings, not illustrated. The rectangular portion 28 of the rotor shaft 24 includes four planar sides 30 each of which has a substantially equal length and width for supporting magnets 22 on the planar surfaces 30.

Figure 7:
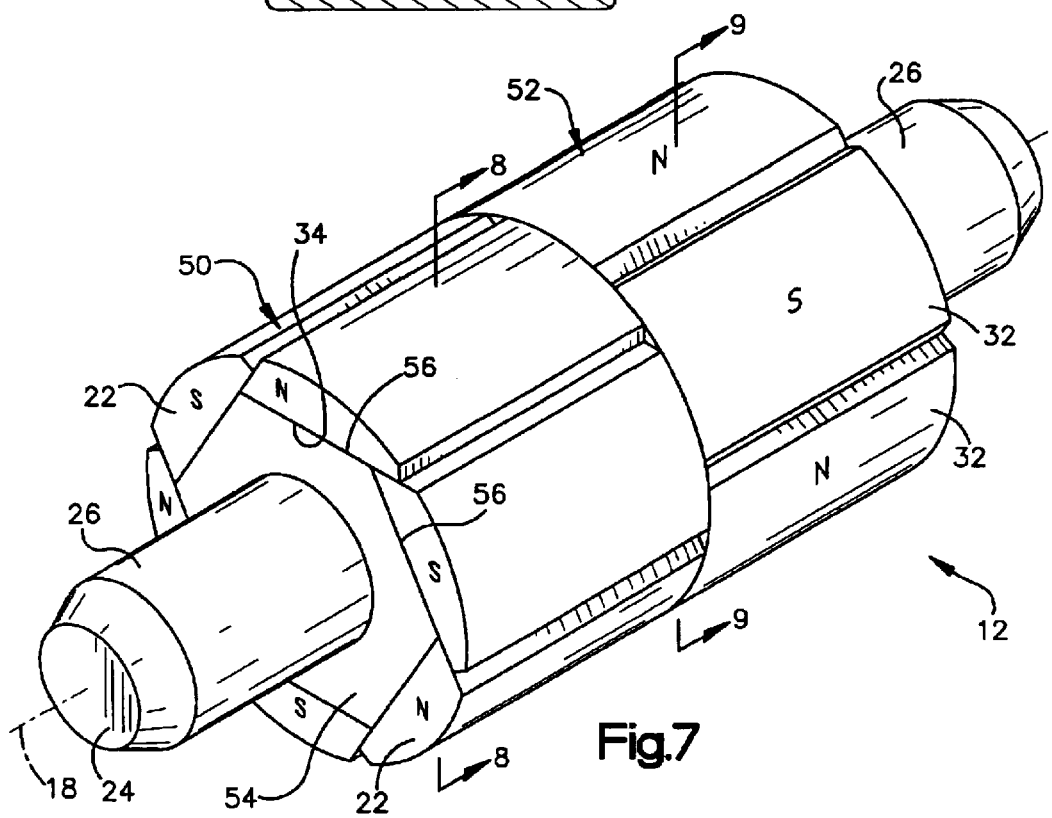
FIG. 7 is a perspective view of a permanent magnet step skewed rotor for use in a six-pole DC motor.
Figures 8, 9:
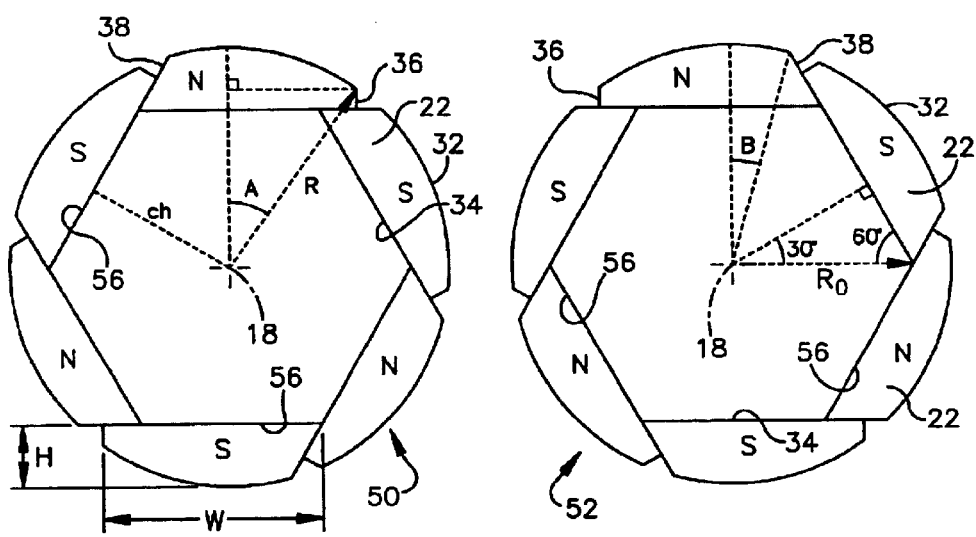
FIG. 8 is a cross sectional view of the step skewed rotor construction taken approximately along the lines 8—8 of FIG. 7.
FIG. 9 is a cross sectional view of the step skewed rotor construction taken approximately along the lines 9—9 of FIG. 7.

While the FIGS. 1–6 illustrate a step skewed rotor 10 for a four pole brushless DC motor and FIGS. 7–9 illustrate a step skewed rotor for a six-pole brushless DC motor, it should be realized that the present invention is equally applicable for use with motors having N poles where N is an even number greater than or equal to 4. Hence, the rotor 10 can be generically defined as having a portion having a uniform cross sectional configuration with N equal planar sides where N is equal to the number of poles of the motor 10.

In the embodiment illustrated in FIGS. 1–6, the step skewed rotor 12 is illustrated for use with a four-pole motor. To this end, the rotor 12 includes shaft 24 having a portion 28 which has a substantially square uniform cross sectional configuration taken in a direction substantially perpendicular to the axis of rotation 18 and which includes four planar sides 30 having substantially equal length and width where the number of planar sides 30 is equal to the number of poles of the motor. A plurality of bread loafed shaped magnets 22 are disposed on each of the planar surfaces 30 on portion 28 of the rotor shaft 24. Each of the magnets 22 has a bread loaf shape and each includes an arcuate surface 32, a planar surface 34 which is adapted to be supported on the planar surface 30 of the rotor shaft 24 and a pair of side surfaces 36, 38 which extend from the planar surface 34 and connect with the arcuate surface 32. Each of the bread loaf magnets 22 is of an identical shape. Side surfaces 36 and 38 of each magnet 22 are parallel and are of unequal lengths for the four-pole design illustrated in FIGS. 1–6 and the bread loaf magnet 12 is unsymmetrical.

Each rotor 12 includes first and second sets 40, 42 of N number of substantially identically shaped bread loaf magnets 22 where N equals four for a four pole motor design. Each set 40, 42 of bread loaf magnets includes N magnets arranged in a circular array around rotor shaft 24. One magnet 22 of each set 40, 42 of magnets is attached to each of the 4 planar sides 30 of portion 28 the rotor shaft 24. The adjacent magnets in each set of magnets are of opposite polarity and the magnets 22 on each planar surface 30 are of the same polarity. For example, as is illustrated in FIG. 1 the four magnets 22 in set 40 includes two south pole magnets, labeled S, and two north pole magnets, labeled N, alternately arranged about the circumference of the rotor shaft 24. The arcuate surfaces 32 of each magnet 22 of each set 40, 42 of magnets cooperate to form a substantially cylindrical surface taken approximately perpendicular to the axis of rotation 18 which forms the outside of the rotor 12.

As is illustrated in FIGS. 3 and 4, the first and second sets of magnets 40, 42 respectively are attached to the planar surfaces 30 of the rotor shaft 24. The first set 40 includes two south pole magnets and two north pole magnets arranged circumferentially about the rectangular portion 28 of the rotor 12 and the second set 42 additionally includes two south pole magnets and two north pole magnets arranged circumferentially around rectangular portion 28 but which are axially displaced and angularly displaced relative to the first set of magnets 40 on the rectangular portion 28 of rotor 12. Thus, each magnet 22 of each set 40, 42 of magnets disposed on the same planar surface 30 has the same polarity and is offset from the magnet of the other set disposed on the same planar surface 30. In addition, while the magnets 22 of each set 40, 42 of magnets having an identical shape, the magnets 22 of the first set 40 are rotated 180° in a radial direction from axis 18 from the magnets 22 of the second set 42 of magnets (see FIG. 5).

The illustrated rotor construction provides a stepped skewed rotor 12 wherein a plurality of identically shaped magnets 22 having a bread loaf configuration are utilized to form a step skewed rotor 12 on a shaft 24 having a substantially uniform cross sectional configuration at 28 where the magnets 22 are supported to form a step skewed rotor 12 which minimizes complicated machining of the rotor shaft 24 and of the magnets 22.

As is illustrated in FIGS. 1 and 2, the rotor 12 has a radius defined as R, each magnet has a width defined as W and a thickness or height defined as H. For the first set 40 of magnets 22 illustrated in FIG. 1:

$$\text{angle } A = \arccos\{[W-(R-H)]/R\}.$$

For the second set 42 of magnets 22 illustrated in FIG. 2:

$$\text{angle } B = \arccos[(R-H)/R].$$

The skew angle, i.e., the difference in angle A and angle B is equal to:

$$\text{angle } B - \text{angle } A$$

and can be adjusted by adjusting the various parameters, R, W and H of the rotor shaft 12 and the magnets 22.

FIGS. 7, 8 and 9 disclose the construction of a step skewed rotor 12 of the present invention where the number of poles N equals 6. The same numerals are used in FIGS. 7–9 to denote the same or similar parts as are denoted in FIGS. 1–6.

As is illustrated in FIG. 7, the 6 pole rotor 12 is formed from a rotor shaft 24 and a plurality of identically shaped bread loaf magnets 22 which are arranged circumferentially about the rotor shaft 24 in a first set 50 of bread loaf magnets and a second set 52 of identically shaped bread loaf magnets which are skewed by a predetermined angle from the first set 50 of bread loaf magnets 22 to form a step skewed rotor 12.

The rotor shaft 24 includes cylindrical end portions 26 which mount the rotor 12 for rotation in a well known manner. The rotor 12 includes a central portion 54 having a uniform hexagonal cross sectional configuration taken in a radial direction from the axis of rotation 18 of shaft 24. The hexagonal portion 54 of rotor 12 includes a plurality of planar surfaces 56 each of which have a substantially identical length and width and which cooperate to form the hexagonal portion of the rotor shaft 24. Each magnet 22 of each set 50, 52 of magnets has an identical bread loaf shape including an arcuate upper surface 32 and a bottom planar surface 34 which is adapted to be mounted on one of the planar surfaces 56 of the rotor shaft 24. Each of the bread loaf magnets includes side surfaces 36 and 38 which extend from the bottom planar surface 34 to the arcuate surface 32. As is illustrated in FIGS. 8 and 9, the arcuate surfaces 32 of each set of magnets 22 form a cylindrical outer surface of the rotor 12.

The first set of magnets 50 is skewed from the second set of magnets 52 by a predetermined skew angle in FIGS. 7–9 where:

skew angle=angle $A$-angle $B$ angle $A=\arcsin[(W-R_O/2)/R]=\arcsin\{[W-(R-H)/\sin 60°/2]/R\}$.

angle $B=90°-30°-\arccos(ch/R)=60°-\arccos[(R-H)/R]$.

It should be appreciated that the skew angle can be controlled by controlling the various dimensions of the bread loaf magnets 22 and shaft 24 including the height and width of the magnets 22 and by controlling the radius R and the dimensions of the rotor 12. In addition, while N has been illustrated in FIGS. 1–6 by being equal 4 and in FIGS. 7–9 as being equal to 6 other pole configurations could be utilized where N equals other than 4 or 6, for example, an eight-pole motor could be fabricated according to the present invention.

Each of the bread loaf shaped magnets 22 of each set 50, 52 of magnets is identically shaped and includes the top arcuate surface 32, bottom planar surface 34 and side surfaces 36, 38. The individual magnets of the first set 50 are offset by the skew angle, angle A minus angle B to form the stepped skewed rotor 12 illustrated in FIG. 7. The magnets 22 of the first set 50 are mounted on the planar surfaces 56 on rotor shaft 24 with the magnets 22 of the first set 50 rotated 180° in a radial direction from axis 18 from the position of the magnets in the second set 52 of magnets 22. This can be more fully seen viewing the magnets in FIGS. 8 and 9 which discloses the opposite orientation (i.e., rotated 180°) of each of the magnets 22 mounted on each of the planar surfaces 56. The magnets 22 of the first and second sets 50, 52 of magnets which are mounted on each individual planar surface 56 are of the same polarity, i.e., they are either both North pole magnets indicated with an N in the figures or South pole magnets indicated with an S in the figures. Magnets mounted on adjacent surfaces 56 have the opposite orientation, i.e., the set of magnets 50 is made up of three North pole magnets interspaced by three South pole magnets.

The construction of the present invention provides for a step skewed rotor 12 without requiring extra machining for different sections of the rotor shaft on which the magnets are supported and all of the magnets have an identical shape further limiting the cost and complexity of machining the magnets. The skew angle can be adjusted by changing the magnet and shaft dimensions and as is well known the use of the stepped skewed rotor reduces the effects of harmonics and improves the performance of the motor. The step skew design as disclosed herein simulates the effect of a smooth skew but reduces the complexity of machining both the shaft and the magnets mounted on the shaft. The use of identically shaped magnets where the orientation of the magnets is reversed in different sections of the rotor to form a step skewed rotor reduces the cost of construction of the step skewed rotor 12.

While specific embodiments of the invention have been shown and described in detail to illustrate the application of the principles of the invention, it will be understood that the invention may be embodied otherwise without departing from such principles.

What is claim is:

1. A brushless DC motor having a step skewed rotor comprising a housing, a stator located within said housing, a step skewed rotor located with said housing and being rotatable about an axis of rotation within said stator, said step skewed rotor including a rotor shaft having a portion of which has a uniform cross sectional configuration taken in a direction substantially perpendicular to said axis of rotation, defined by N planar sides of substantially equal length and width where N is equal to the number of poles of the motor, a first and a second set of N number of substantially identically shaped magnets one of each set being attached to each of said N planar sides of said rotor shaft, each of said magnets having an exterior arcuate surface, said arcuate surface on said magnets of said first sets of magnets and said arcuate surface on said magnets of said second set of magnets each cooperating to form a cylindrical surface having a substantially circular cross sectional configuration taken approximately perpendicular to said axis of rotation, each of said N planar sides of said rotor shaft having one magnet of said first set and one magnet of said second set of magnets attached thereto with said one magnet of said first set being disposed contiguous to said one magnet of said second set on each of said N planar sides of said rotor shaft, each of said second set of N number of magnets being offset from each of said first set of N number of magnets to form a step skewed rotor.

2. A brushless DC motor having a step skewed rotor as defined in claim 1 wherein half of the magnets of each of said first and second sets of N magnets are north pole magnets and half are south pole magnets, and each of said N sides of said rotor shaft has one magnet of said first set and one magnet of said second set having like polarity attached thereto with each of said N planar sides of said rotor shaft supporting magnets thereon which are of the opposite polarity as the magnets supported on an adjacent planar side of said rotor shaft.

3. A brushless DC motor having a step skewed rotor as defined in claim 1 wherein each of said magnets includes a first planar surface attached to one of said N planar sides of said rotor shaft and disposed opposite to said arcuate surface and a pair of side surfaces each of extend between said first planar surface and said arcuate surface, said first planar surface, said arcuate surface and said pair of side surfaces cooperating to define a magnet having a bread loaf shape.

4. A brushless DC motor having a step skewed rotor as defined in claim 1 wherein each of said substantially identically shaped magnets is unsymmetrical and each of said magnets of said first set of magnets is rotated 180° in a radial direction from said axis of rotation with respect to the orientation of each of the magnets of said second set of bread loaf magnets attached to the same planar side of said rotor shaft.

5. A brushless DC motor having a step skewed rotor as defined in claim 1 wherein each of said magnets of said first set of magnets on each of said N planar sides of said rotor shaft are offset a predetermined angle about the axis of rotation from the magnets of the second set of magnets which are located on the same planar surfaces of said rotor shaft.

6. A brushless DC motor having a step skewed rotor as defined in claim 1 wherein N equals 4.

7. A brushless DC motor having a step skewed rotor as defined in claim 3 wherein each of said substantially identically shaped magnets is unsymmetrical and each of said magnets of said first set of magnets is rotated 180° in a radial direction from said axis of rotation with respect to the orientation of each of the magnets of said second set of magnets attached to the same planar side of said rotor shaft.

8. A brushless DC motor having a step skewed rotor as defined in claim 3 wherein said pair of side surfaces of each of said identically shaped magnets include a first side surface of a first height, and a second side surface of a second height.

9. A brushless DC motor having a step skewed rotor as defined in claim 5 wherein each of said substantially identically shaped magnets is unsymmetrical and each of said magnets of said first set of magnets is rotated 180° in a radial direction from said axis of rotation with respect to the orientation of each of the magnets of said second set of bread loaf magnets attached to the same planar side of said rotor shaft.

10. A brushless DC motor having a step skewed rotor as defined in claim 8 wherein each of said substantially identically shaped magnets is unsymmetrical and each of said magnets of said first set of magnets is rotated 180° in a radial direction from said axis of rotation with respect to the orientation of each of the magnets of said second set of bread loaf magnets attached to the same planar side of said rotor shaft.

11. A brushless DC motor having a step skewed rotor comprising a housing, a stator located within said housing, a step skewed rotor located with said housing and being rotatable about an axis of rotation within said stator, said step skewed rotor including a rotor shaft having a portion of which has a uniform cross sectional configuration taken in a direction substantially perpendicular to said axis of rotation, defined by N planar sides of substantially equal length where N is equal to the number of poles of the motor, a first and a second set of N number of substantially identically shaped bread loaf magnets, each of which includes a planar bottom surface for attachment to one of said planar sides of said rotor shaft, a top arcuate surface and first and second side surfaces which extend from said planar bottom surface of said bread loaf magnet to said top arcuate surface, each of said N planar sides of said rotor shaft having one bread loaf magnet of said first set and one bread loaf magnet of said second set of bread loaf magnets attached thereto with said one bread loaf magnet of said first set being disposed contiguous to said one bread loaf magnet of said second set on each of said N planar sides of said rotor shaft, each of said second set of N number of bread loaf magnets being offset from each of said first set of N number of bread loaf magnets by a predetermined angle to form a step skewed rotor.

12. A brushless DC motor having step skewed rotors as defined in claim 11 wherein said pair of side surfaces of each of said identically shaped bread loaf magnets include a first side surface of a first height, and a second side surface of a second height.

13. A brushless DC motor having step skewed rotors as defined in claim 11 wherein each of said substantially identically shaped bread loaf magnets is unsymmetrical and each of said bread loaf magnets of said first set of bread loaf magnets is rotated 180° in a radial direction from said axis of rotation with respect to the orientation of each of the bread loaf magnets of said second set of bread loaf magnets attached to the same planar side of said rotor shaft.

14. A brushless DC motor having step skewed rotors as defined in claim 13 wherein said pair of side surfaces of each of said identically shaped bread loaf magnets include a first side surface of a first height, and a second side surface of a second height.

15. A brushless DC motor having step skewed rotors as defined in claim 11 wherein half of the bread loaf magnets of each of said first and second sets of N bread loaf magnets are north polarity bread loaf magnets and half are south polarity bread loaf magnets, and each of said N sides of said rotor shaft has one bread loaf magnet of said first set and one bread loaf magnet of said second set having like polarity attached thereto with each of said N planar sides of said rotor shaft supporting bread loaf magnets thereon which are of the opposite polarity as the bread loaf magnets supported on an adjacent planar side of said rotor shaft.

16. A brushless DC motor having step skewed rotors as defined in claim 14 wherein half of the bread loaf magnets of each of said first and second sets of N bread loaf magnets are north polarity bread loaf magnets and half are south polarity bread loaf magnets, and each of said N sides of said rotor shaft has one bread loaf magnet of said first set and one bread loaf magnet of said second set having like polarity attached thereto with each of said N planar sides of said rotor shaft supporting bread loaf magnets thereon which are of the opposite polarity as the bread loaf magnets supported on an adjacent planar side of said rotor shaft.

17. A brushless DC motor having step skewed rotors as defined in claim 11 wherein each of said identically shaped bread loaf magnets has a height H, a width W and a radius R which extends from said axis of rotation to said top arcuate surface of said bread loaf magnet and said first set of bread loaf magnets is offset by a skew angle from said second set of bread loaf magnets where the skew angle is equal to arccos $[(R-H)/R]$-arccos $\{[W-(R-H)]/R\}$.

* * * * *